United States Patent [19]

Loblock

[11] 4,257,136
[45] Mar. 24, 1981

[54] HOLD-DOWN DEVICE FOR DOCKLEVELLER

[75] Inventor: Norton M Loblick, Edmonton, Canada

[73] Assignee: Argo Engineering Ltd., Edmonton, Canada

[21] Appl. No.: 40,649

[22] Filed: May 21, 1979

[51] Int. Cl.³ .............................................. E01D 1/00
[52] U.S. Cl. .................................................... 14/71.3
[58] Field of Search ...................... 14/71.7, 71.3, 71.1; 267/137; 188/283, 279, 288

[56] References Cited

U.S. PATENT DOCUMENTS

| | | | |
|---|---|---|---|
| 2,689,965 | 9/1954 | Fenton | 14/71.7 |
| 2,881,457 | 4/1959 | Rodgers | 14/71.7 |
| 3,117,332 | 1/1964 | Kelley | 14/71.3 |
| 3,167,796 | 2/1965 | Layne | 14/71.3 |
| 3,271,801 | 9/1966 | Dieter | 14/71.3 |
| 3,388,413 | 6/1968 | Clarke | 14/71.7 |
| 3,685,076 | 8/1972 | Loblick | 14/71.7 |
| 3,694,840 | 10/1972 | Loblick | 14/71.7 |
| 3,835,497 | 9/1974 | Smith | 14/71.3 |
| 4,091,488 | 5/1978 | Artzberger | 14/71.7 |

*Primary Examiner*—Nile C. Byers, Jr.
*Attorney, Agent, or Firm*—Max L. Wymore

[57] ABSTRACT

A releasable hold-down device is provided for use in a dockleveller wherein dock-raising springs are used to raise the dockboard. The hold-down device comprises a hydraulic cylinder assembly having the piston connected to the dockboard and the cylinder connected to the dockleveller frame. The cylinder assembly must thus expand and contract to permit the dockboard to be raised by the spring and lowered by the weight of a man standing on the dockboard. The cylinder assembly has fluid-filled stem and base chambers. A connecting conduit permits fluid movement between the chambers. A valve means in the conduit controls this fluid movement. There is provided means for mechanically opening the valve means to permit the dockboard to be raised by the spring with concomitant expansion of the cylinder assembly. When such mechanical opening means is inoperative, the valve means is operative to (1) close if there is a greater fluid pressure in the stem chamber than in the base chamber (thus locking the device and preventing the spring from raising the dockboard), and (2) open if there is a greater fluid pressure in the base chamber than in the stem chamber (thus permitting the cylinder assembly to contract when a weight acts on the raised dockboard).

2 Claims, 12 Drawing Figures

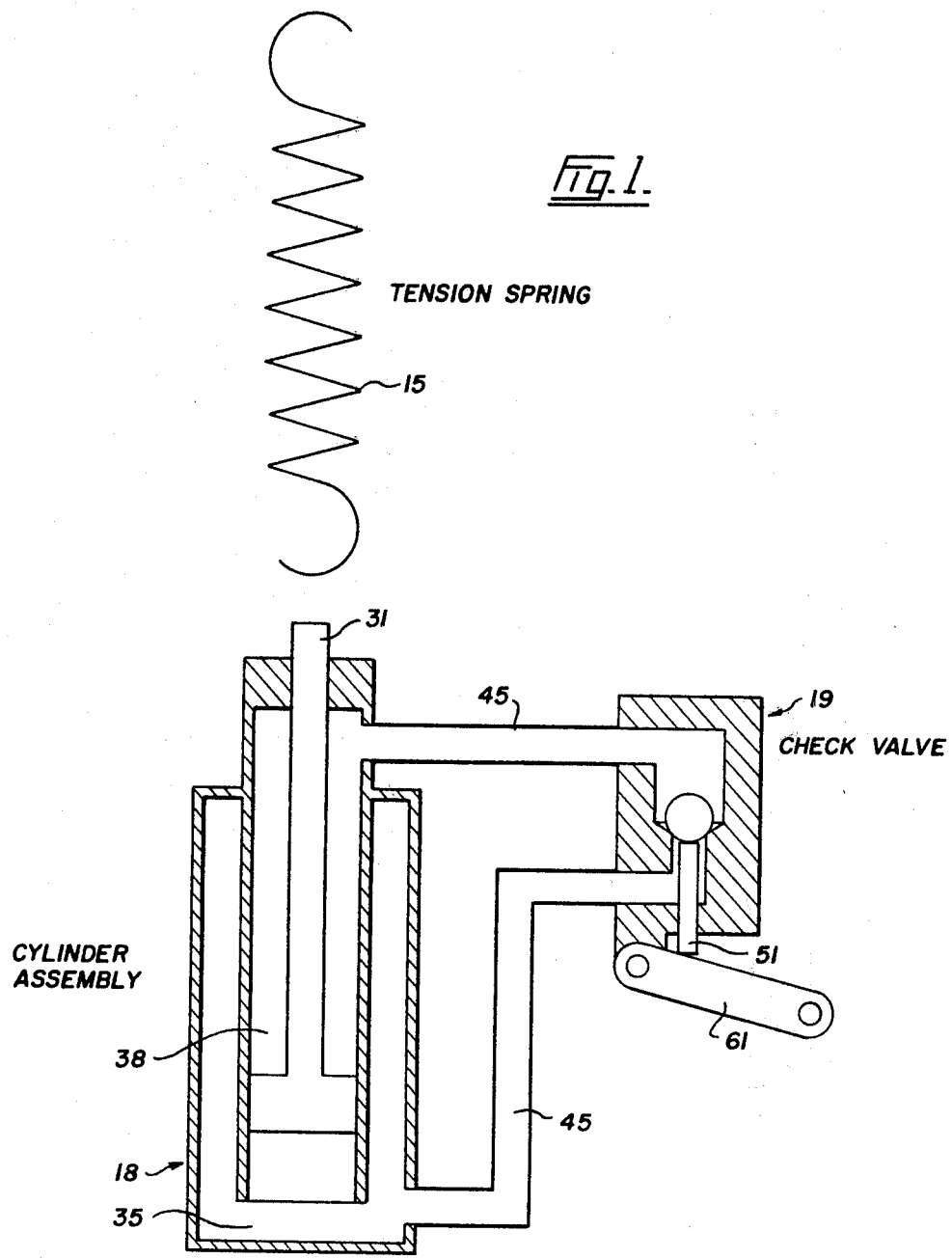

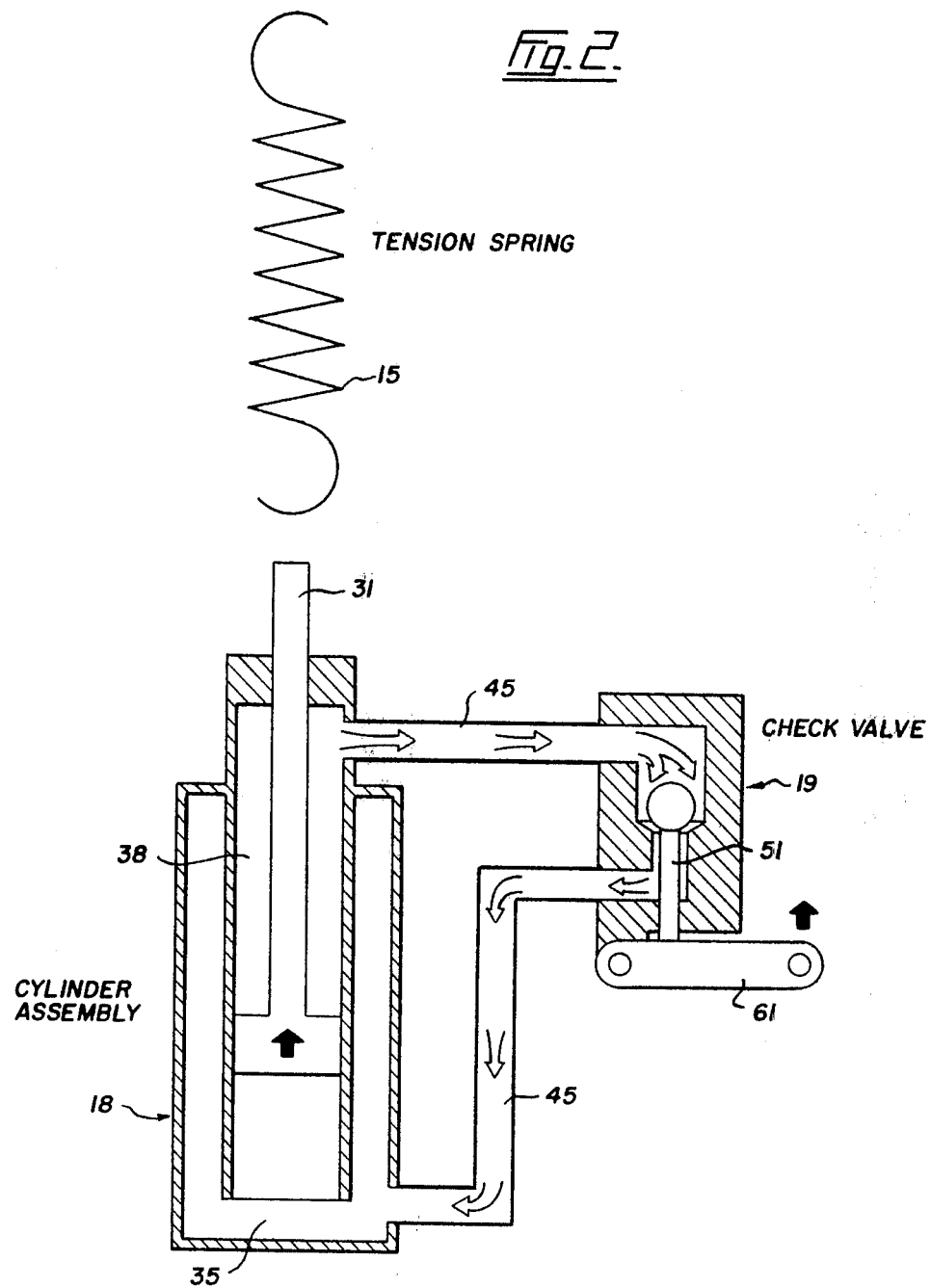

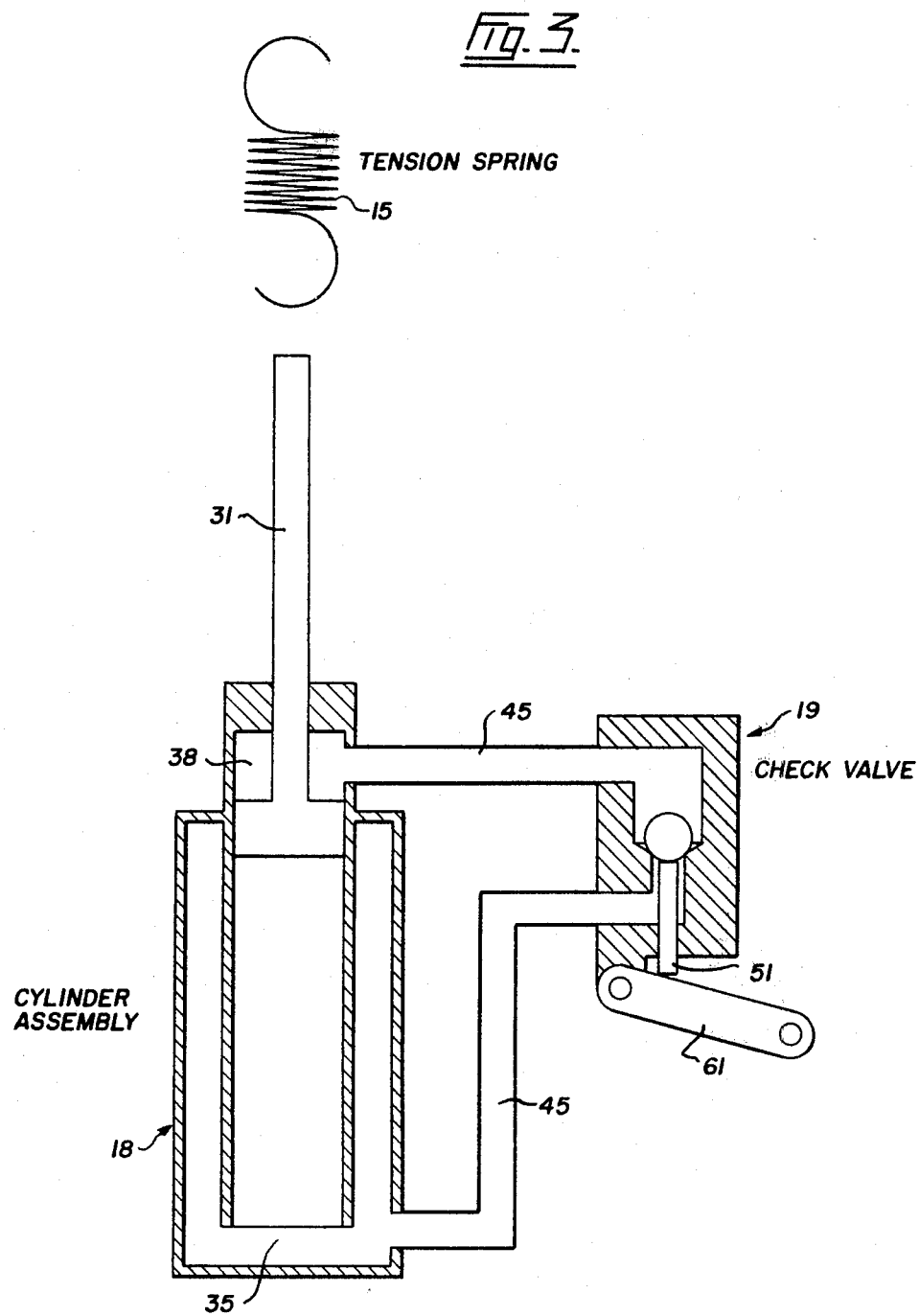

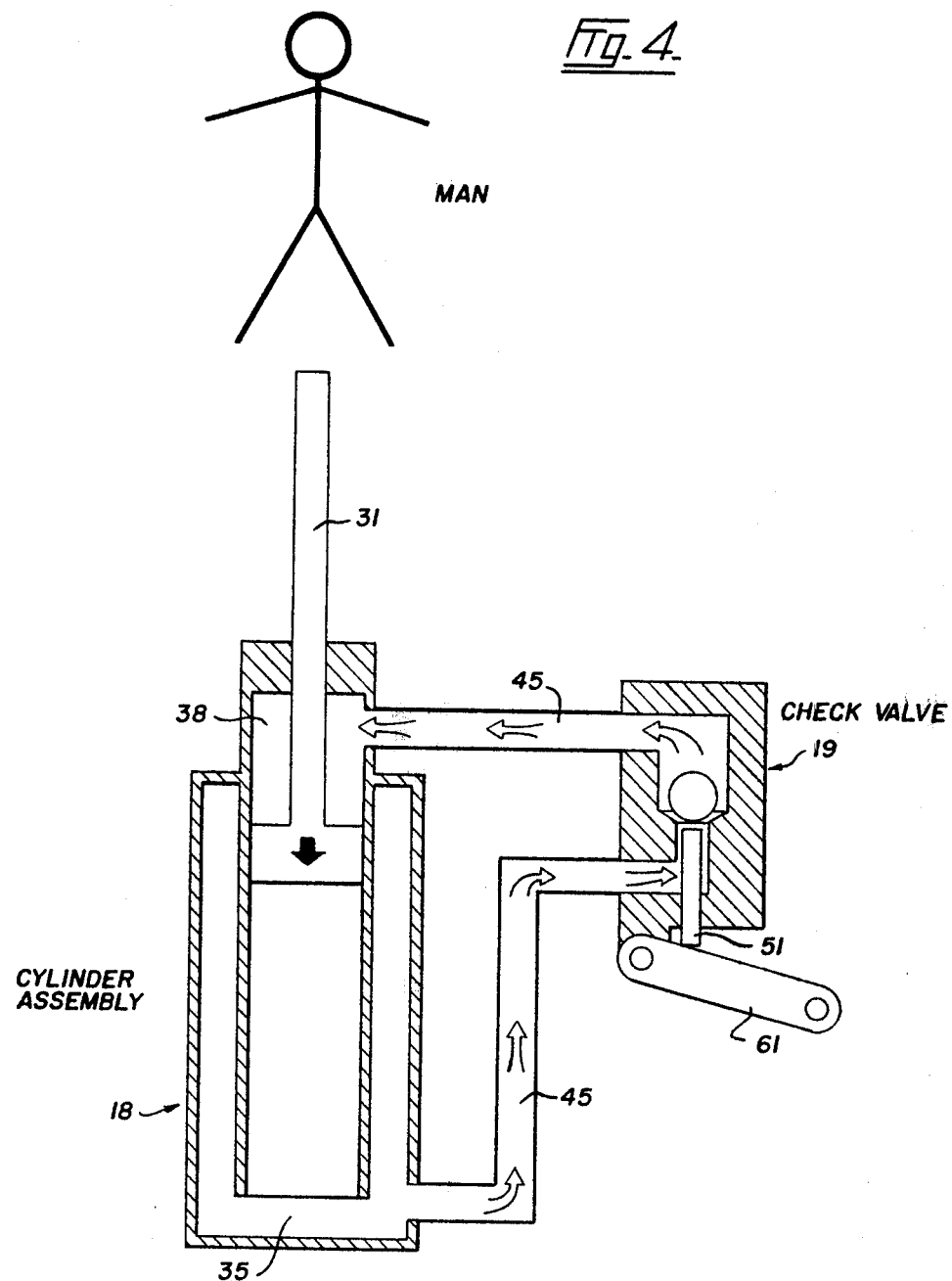

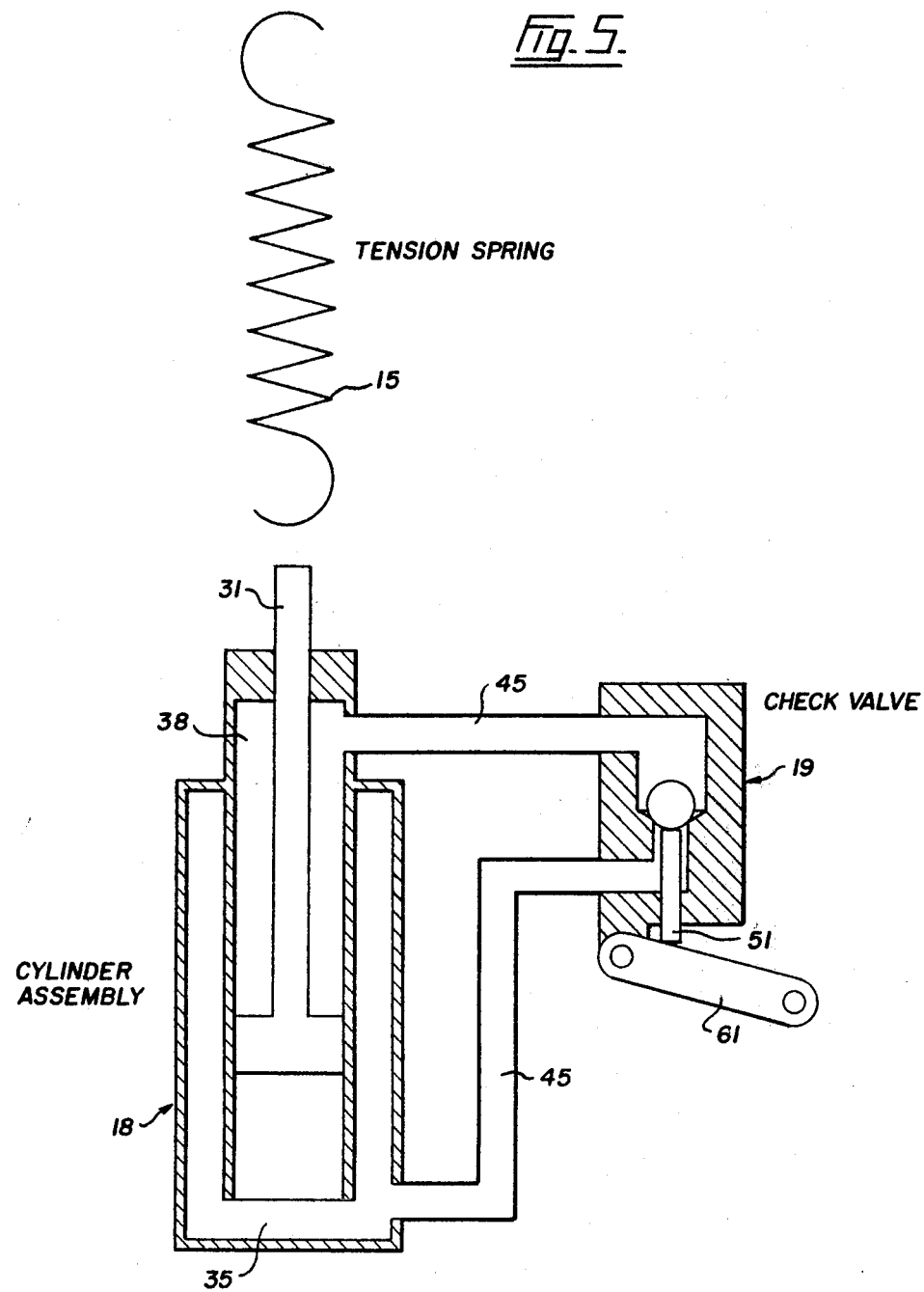

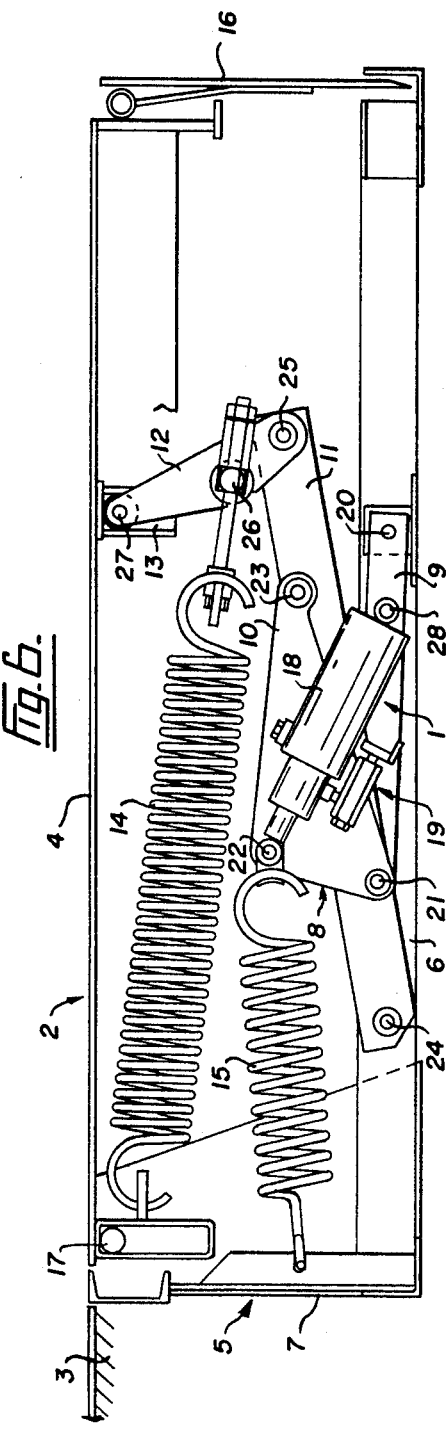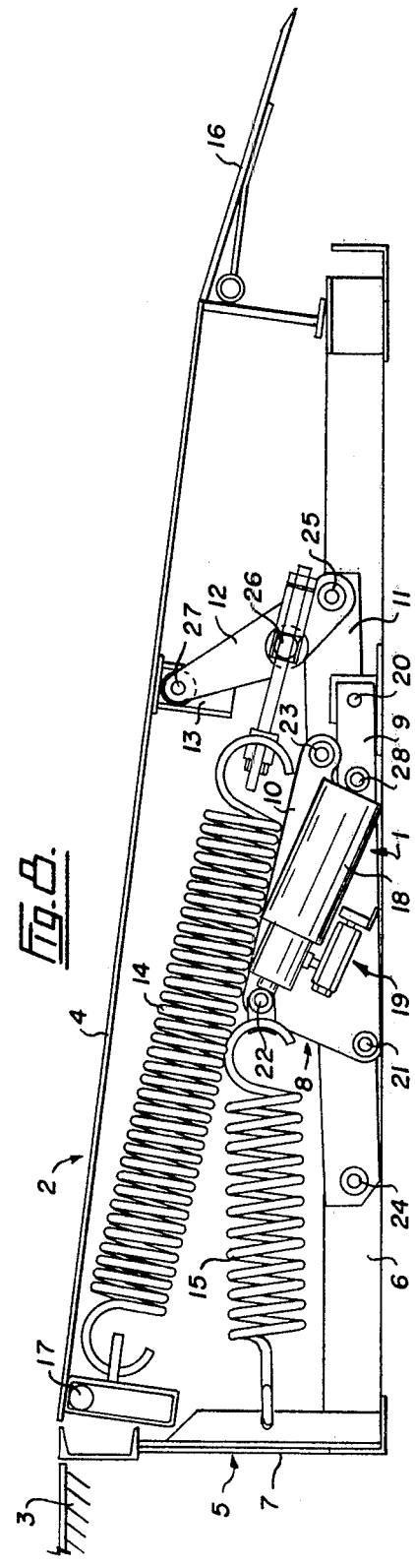

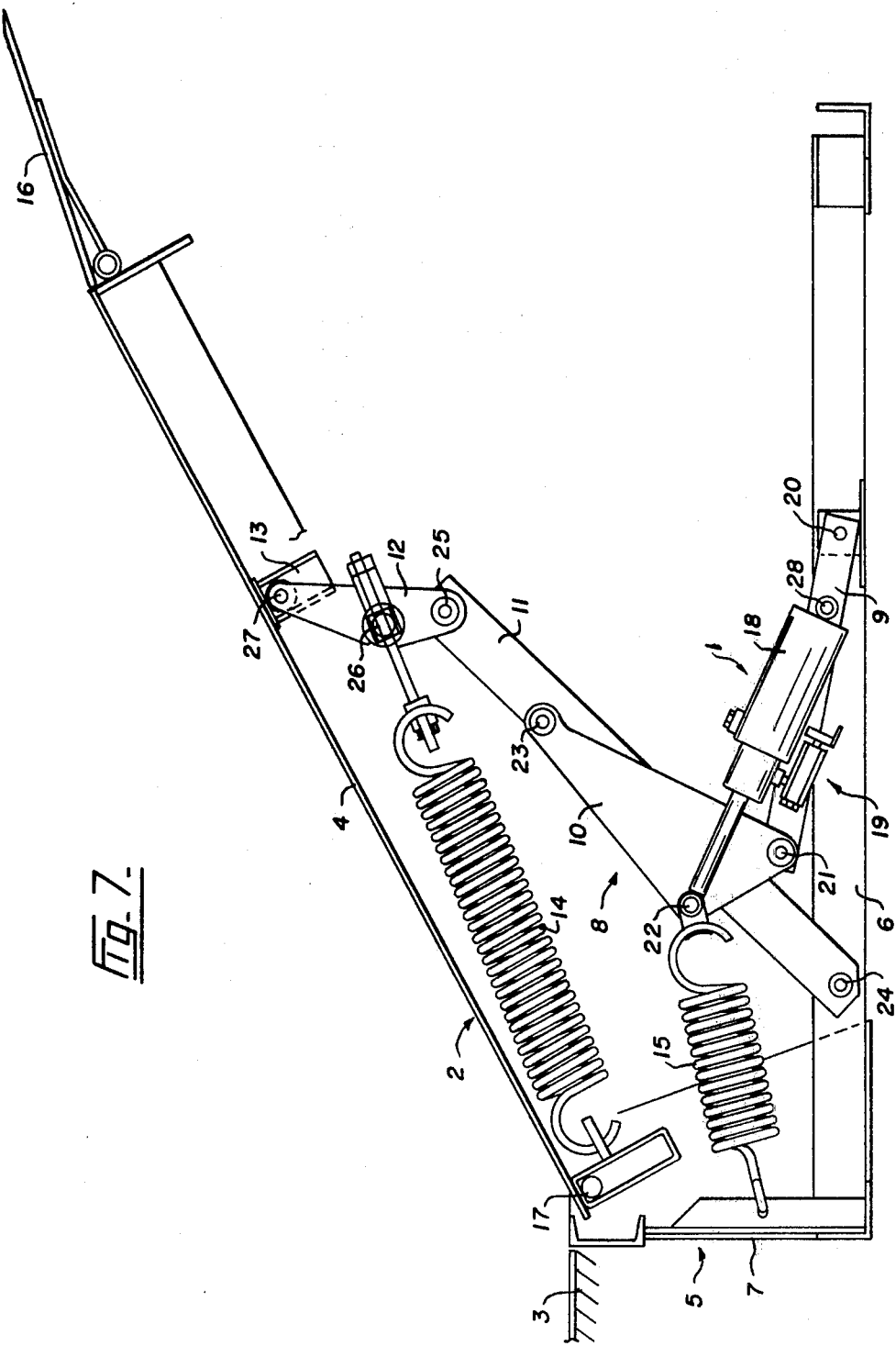

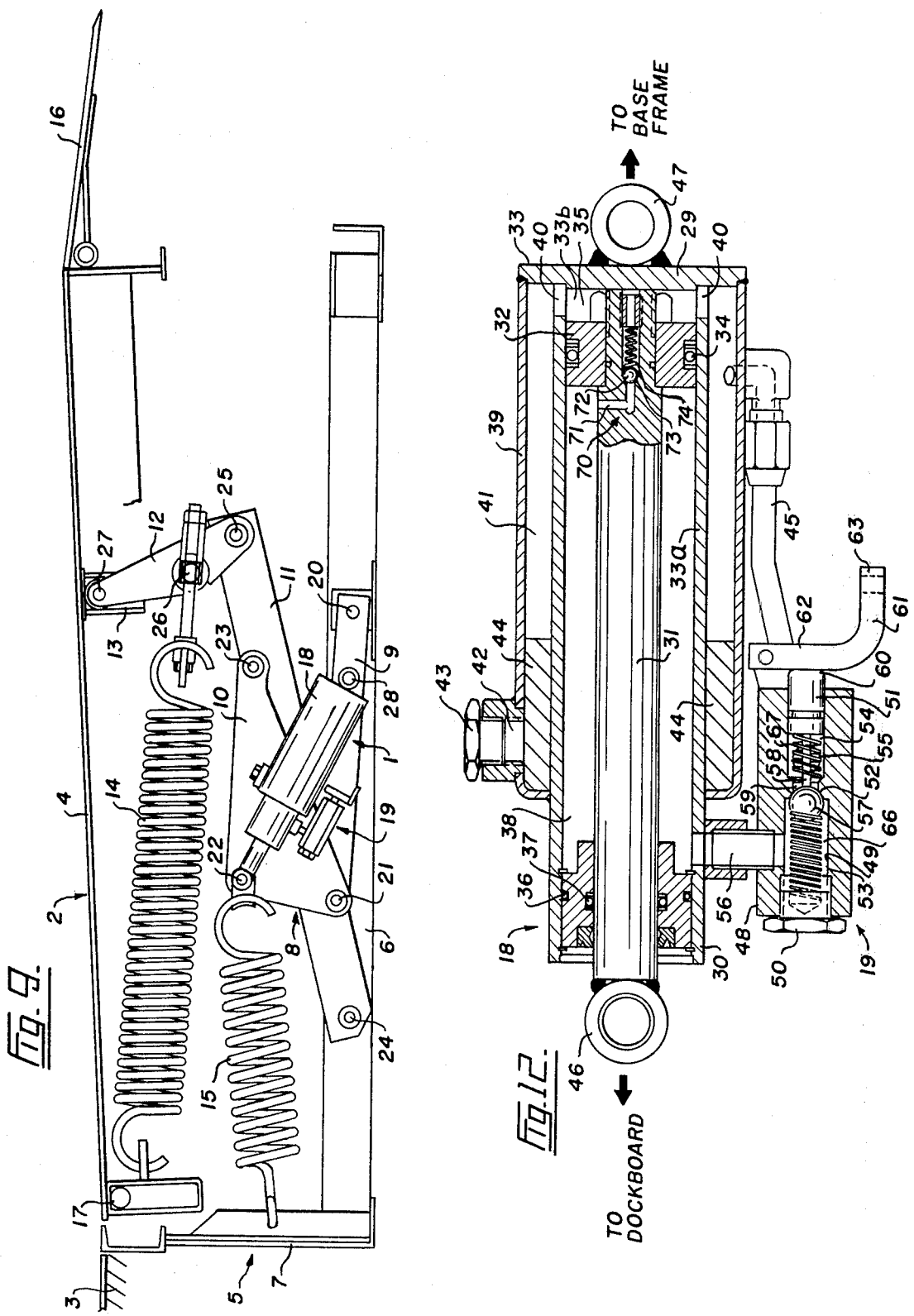

HOLD-DOWN DEVICE FOR DOCKLEVELLER

BACKGROUND OF THE INVENTION

The present invention relates to docklevellers, and in particular to a hold-down device used to lock the dockboard at a given elevated or horizontal or declined position.

Docklevellers are used to provide a ramp between the deck of a truck and the loading bay of a warehouse or the like, in order to facilitate loading or unloading. Docklevellers provide both a compensation for the height differential between the two levels and a bridge for the gap existing therebetween.

Various types of docklevellers are known. For the most part they include a base frame mounted in a recessed pit in the loading bay, a dockboard pivoted at its inner end to the base frame, and a dock-raising mechanism. In this manner, the dockboard is movable between a horizontal cross-traffic position, wherein the dockboard is flush with the loading bay, an elevated loading position wherein the dockboard extends to a vehicle platform higher than the loading bay, and a lowered, declined position wherein the dockboard extends to a vehicle platform which is lower than the loading bay.

In order to more effectively bridge the gap intermediate the dockboard and the vehicle bed, a lip extension is hinged to the front end of the dockboard. The lip extension is moveable between a vertical hanging position and a near horizontal position respectively as the dockboard is raised between its horizontal and elevated positions. For this purpose a lip extending mechanism is employed such as the one disclosed in U.S. Pat. No. 3,685,076. In this case the lip extending mechanism is actuated by the dock-raising mechanism so as to extend the lip only when the dockboard is raised higher than the level of the vehicle bed. The dockboard is then lowered to its loading position, at which point the now horizontal lip contacts the vehicle bed.

The dock-raising mechanisms known in the prior art may be manually or mechanically operated, or may utilize a hydraulic or pneumatic cylinder. They may operate directly between attachment sites on the dockboard and base frame, or between the base frame and a lever-link mechanism. A dockboard powered by a hydraulic cylinder operating between the base frame and a lever-link mechanism is more fully described in U.S. Pat. No. 3,694,840.

Today warehouses are often constructed by development companies wishing to avoid the additional expense of the power cylinders in the docklevellers. This change-over to the mechanically powered systems has presented problems in the industry. Whereas the use of the power cylinders provides a built-in hold-down device in the docklevellers, the use of the mechanical raising mechanisms requires a separate reliable hold-down.

In most mechanically operated docklevellers springs are used to provide a continuous lifting force to the dockboard. In order to lock the dockboard either at its horizontal cross-traffic position, at an elevated loading position, or at a declined loading position, the locking function of the hold-down device is required. The hold-down must additionally be releaseable to allow the dockboard to move between positions.

Presently the hold-down devices used in the spring-actuated docklevellers are mechanical, employing complex ratchet devices or friction bars to perform the locking and releasing functions. These mechanical hold-downs however are subject to slippage and other mechanical failures.

SUMMARY OF THE INVENTION

In accordance with the present invention a hold-down device ("hold-down") is provided for use in a dockleveller. The hold-down is connected with the dockboard and dockleveller base frame and is functional to lock the dockboard at a given horizontal, declined or elevated position, in opposition to a continuous upward force imparted to the dockboard by mechanical dock-raising means (such as a spring). The hold-down is releaseable, to permit the dockboard to be rotated or pivoted between positions.

The hold-down comprises a fluid-containing hydraulic cylinder assembly having a piston element reciprocating within a cylinder element. This piston element is fluid-tight within the cylinder so that fluid may not bypass it. Fluid-filled chambers on either side of the piston head are formed by the assembly, these being a stem chamber around the piston stem and a base chamber on the opposite side of the piston head. The base chamber of the cylinder is constructed such that the volume of fluid contained therein when the cylinder assembly is fully expanded is greater than the volume of fluid contained in the stem chamber when the cylinder assembly is fully contracted. A conduit connecting the stem and base chambers enables fluid to move between the chambers, thereby permitting expansion and contraction of the cylinder assembly as the dockboard is respectively raised and lowered. A valve means in the conduit controls this fluid movement. There is provided means for mechanically opening the valve means to permit the dockboard to be raised by the dockboard-raising means with concomitant expansion of the cylinder assembly. When such mechanical opening means is inoperative, the valve means is operative (1) to close if there is a greater fluid pressure in the stem chamber than in the base chamber (thereby locking the device against expansion and preventing the spring from raising the dockboard), and (2) to open if there is a greater fluid pressure in the base chamber than in the stem chamber (thereby permitting the cylinder assembly to contract when a weight acts on the raised dockboard, whereby the dockboard is lowered).

Preferably, the valve means is a check valve such as a ball and seat check valve and the mechanical opening means is a manually operated lever and piston assembly which can be actuated to unseat the ball.

In another preferred feature, the base chamber includes a reservoir section in order to provide a volume of fluid in excess of the fluid volume contained in the stem chamber. This reservoir section is provided by a housing surrounding an inner cylinder, the inner cylinder being open-ended at the base end so that a continuous chamber is provided.

The reservoir section preferably contains a compressible fluid body, such as a pocket of air, which combines with the hydraulic oil otherwise filling the stem and base chambers to provide the 'fluid' previously referred to. The compressible body, when compressed, assists in generating a greater fluid pressure in the base chamber than in the stem chamber, which pressure differential is sufficient to open the check valve. Additionally, the pressure generated by the compressible body increases the flow rate from the base chamber to the stem chamber, enabling the cylinder assembly to be rapidly contracted and subsequently locked at a desired position.

In another preferred aspect, normally closed valve means are provided to control a second conduit connecting the stem and base chambers. Such normally closed valve means, which may be a spring-loaded ball and seat check valve, are adapted to open when the pressure in the stem chamber reaches a pre-determined level. This safety release system is provided to permit fluid movement from the stem chamber to the base chamber when the fluid pressure in the stem chamber is greater than the normal operating pressures.

"Broadly stated, the invention is a hold-down device for use in a dockleveller wherein a dockboard is pivotally mounted at its inner end to a base frame for rotation about said pivot between cross-traffic, fully raised and declined positions and wherein mechanical dockboard raising means are provided to rotate the dockboard upwardly from the declined and cross-traffic position to the fully raised position. The hold-down device comprises a hydraulic cylinder assembly having a stem end and a base end and comprising a piston element, having a piston head, and a cylinder element within which the piston element reciprocates, said assembly being mountable so that one of the elements may be interconnected with the dockboard and the other element may be interconnected with the base frame, whereby the cylinder assembly may expand and contract respectively in response to the dockboard being raised and lowered; said cylinder assembly having a fluid-filled stem chamber and a fluid-filled base chamber, the volume of fluid in the base chamber when the cylinder assembly is fully expanded being greater than the volume of fluid in the stem chamber when the cylinder assembly is fully contracted, said piston head being adapted to prevent fluid movement between the chambers; said fluid in the base chamber comprising a body of compressible fluid; first and second conduit means extending from the stem and base chambers; check valve means connecting said conduit means and controlling fluid movement through the conduit means between the chambers; said check valve means comprising a valve body forming a first valve chamber, a first port connecting the valve chamber with the conduit means communicating with the stem chamber, a second port connecting the valve chamber with the conduit means communicating with the base chamber, and a valve seat at that end of the valve chamber adjacent the second part, and a valve member disposed in the valve chamber, for seating on the valve seat to prevent flow through the valve chamber; first means for mechanically unseating the valve member to permit the cylinder assembly to be expanded as the dock-raising means raises the dockboard, said first means extending through the valve body wall in sealing engagement therewith and being exposed only to the pressure in the reservoir chamber; said check valve means being operative to close if there is a greater fluid pressure in the stem chamber than in the base chamber and the first means is inoperative, thereby preventing expansion of the cylinder assembly; said valve means being operative to open if there is a greater fluid pressure in the base chamber than in the stem chamber, thereby permitting the cylinder assembly to contract."

DESCRIPTION OF THE DRAWINGS

FIG. 1 is a schematic showing the hold-down in the locked, contracted, cross-traffic position;

FIG. 2 is a schematic showing the hold-down being expanded with the mechanical opening means actuated to hold the valve means open, thereby allowing the dockboard to pivot upwardly;

FIG. 3 is a schematic showing the hold-down fully expanded with the spring contracted and the mechanical opening means inoperative;

FIG. 4 is a schematic showing the hold-down being contracted by a man standing on the dockboard, the valve means being open;

FIG. 5 is a schematic showing the hold-down in a locked condition at a loading position, the valve means being closed;

FIGS. 6, 7, 8 and 9 are side sectional views showing the hold-down incorporated in a dockleveller in the cross-traffic, fully elevated and declined and elevated loading positions, respectively;

FIG. 12 is a side sectional view of the hold-down.

DESCRIPTION OF THE PREFERRED EMBODIMENT

The Dockboard Installation

Figure 10:
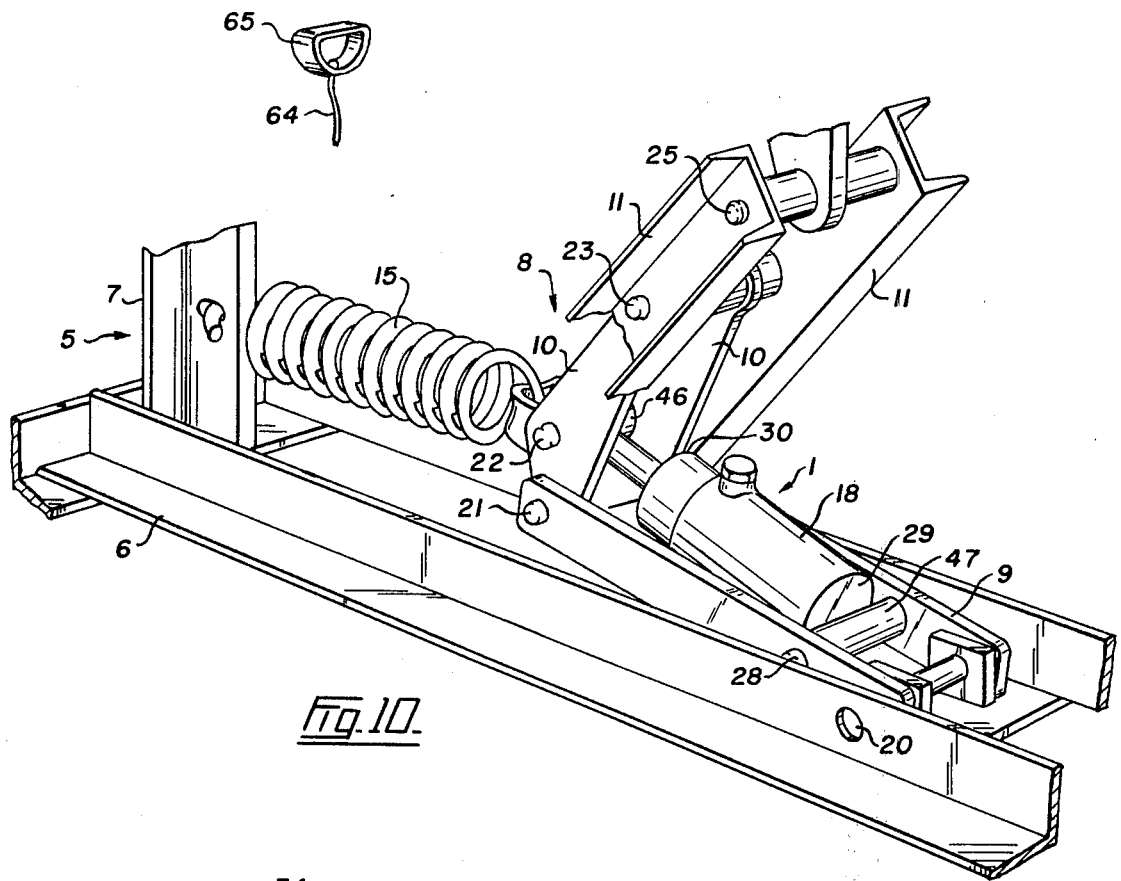
FIG. 10 is a perspective view of the hold-down incorporated in a dockleveller.

With reference to the drawings, the hold-down device 1 is shown mounted in a dockleveller 2. The dockleveller 2 is mounted in a recessed pit of a loading bay 3 such that in the horizontal cross-traffic position, shown in FIG. 6, the dockleveller 2 is flush with the level of the loading bay platform 3. The dockleveller 2 includes a dockboard 4 hinged at its inner end to a base frame 5. The base frame 5 includes horizontal members 6 and vertical members 7 operable to support the dockboard 4.

Mechanical dock-raising means 8 are shown intermediate the dockboard 4 and the base frame 5. In the embodiment shown herein the raising means comprise a spring-actuated lever-link mechanism. Lever-link employing raising means are common to docklevellers; for instance, a lever-link mechanism powered by a hydraulic cylinder is disclosed in U.S. Pat. No. 3,694,840. The lever-link device does not form part of the present invention and is therefore only briefly described herein.

The dock-raising means include parallel spaced link arms 9 pivoted at ther outer ends to the base frame 5 forming pivot points 20. The inner end of each link arm 9 is pivoted to a triangular lever arm 10 at a pivot point 21. Lever arm 10 comprises two parallel spaced plates linked together at their vertices with pins, forming pivot points 21, 22 and 23.

A pair of parallel spaced deck lift arms 11 are provided, the outer ends of which are pivotally attached to the base frame 5 at pivot points 24. Thr triangular lever arms 10 are linked to the lift arms 11 at pivot points 23. The inner ends of the lift arms 11 are pivotally attached to a second pair of parallel spaced triangular lever arms 12 at pivot points 25. The second lever arms 12 are linked at their vertices to form pivot points 25, 26 and 27. Parallel spaced sleeve members 13 in rigid attachment to the dockboard, are linked to the lever arm 12 at pivot points 27.

The dock-raising means 8 further include mechanical lift means, such as tension springs, attached intermediate the base frame and the lever-link mechanism. The present embodiment employs at least two such springs. A main lift spring 14 is provided intermediate pivot point 26 on the second triangular lever arms 12 and the hinge 17 at the rear end of the dockboard 4. The tension of this spring 14 is adjusted so as to provide to the dockboard 4 the majority of the lift force necessary to overcome the gravitational force acting on the dockboard when in a horizontal cross-traffic position. A booster spring 15 is attached between the vertical member 7 of the base frame 5 and pivot point 22 of the lever arms 10. The tension in the booster spring 15 is sufficient to provide an upward lift force on the dockboard 4 operable to raise the dockboard 4 to the fully raised position shown in FIG. 7.

It should be obvious at this point, that the mechanical dock-raising means 8 impart a continuous upward force to the dockboard 4 and in order to lock the dockboard at the cross-traffic or loading positions (FIGS. 6 and 8) the hold-down 1 is necessary. The hold-down is mountable intermediate the dockboard 4 and the base frame 5. As shown in FIGS. 6 and 9, the hold-down is pivotally mounted intermediate pivot points 22 and 28 on the lever-link mechanism. Attachment points are not critical to the function of the hold-down, and one skilled in the dockleveller industry will realize alternate attachment sites.

FIGS. 6–9 additionally illustrate a lip 16 hinged at the front end of the dockboard 4. Lip-raising means (not shown) are operational to pivot the lip from a vertical hanging position to a horizontal position respectively as the dockboard is pivoted from a horizontal to a raised position. The lip-raising means is the subject matter of U.S. Pat. No. 3,685,076 and will not be disclosed herein.

It should be realized that the hold-down of the present invention, although disclosed in combination with the spring-actuated lever-link mechanism, could be adapted into other mechanically operated docklevellers.

The hold-down 1 is seen to include a fluid-filled hydraulic cylinder assembly 18 which expands and retracts respectively in response to the dockboard 4 being raised and lowered. Valve means 19 are provided to control the fluid movement within the cylinder assembly 18. Provided the valve means 19 are closed, the cylinder assembly 18 is locked against expansion and thus the dockboard 4 remains in a given position, in opposition to the upward force imparted by th booster spring 15.

The Hydraulic Cylinder Assembly

Figure 11:
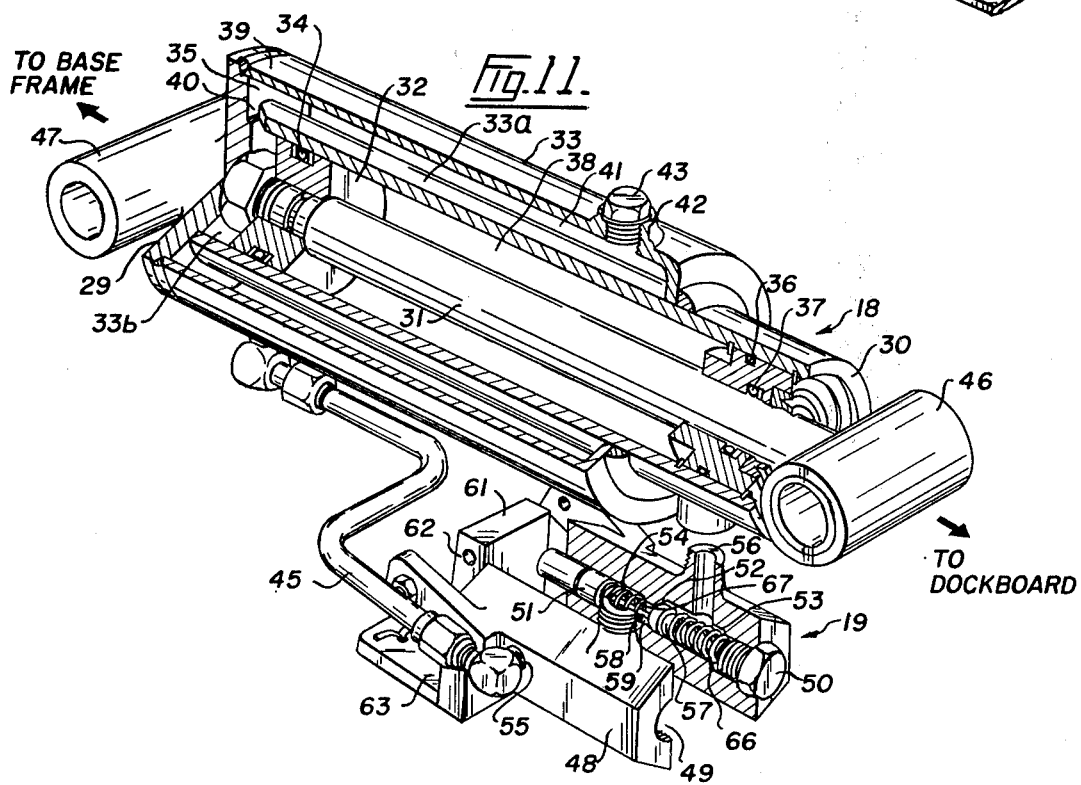
FIG. 11 is a perspective view of the hold-down having cut-away portions of the hydraulic cylinder assembly and the valve means.

Referring to FIGS. 11 and 12, the hydraulic cylinder assembly 18 has a base end 29 and a stem end 30. A piston element 31 is provided, having a piston head 32 which reciprocates in a cylinder element 33. The piston head 32 has a fluid-tight seal 34 with the cylinder element 33, forming a fluid-filled base chamber 35 between the piston head 32 and the base end 29. Fluid-tight seals 36 and 37 are provided between the piston element 31 and the cylinder element 33, thereby forming a fluid-filled stem chamber 38 intermediate the piston head 32 and stem end 30.

The stem and base chambers 38 and 35 are interconnected by a conduit 45. Valve means 19 in the conduit 45 is provided to control the fluid movement between these two chambers.

The base chamber 35 is constructed such that the volume of fluid contained in the base chamber 35 when the cylinder assembly 18 is fully expanded is greater than the volume of fluid contained in stem chamber 38 when the cylinder assembly 18 is fully contracted. This excess fluid volume assures that, on contraction of the cylinder assembly 18, the stem chamber 38 is completely fluid-filled. Anything less than complete filling would result in the inclusion of air into the stem chamber 38, which inclusion destroys the locking function of the hold-down. The reasoning for the inclusion of this excess fluid volume in the base chamber will be apparent once the operation of the system has been described.

This excess volume is provided by including a reservoir tank 39 as part of the cylinder element 33. Preferably, an inner cylinder 33a is provided, which inner cylinder 33a is open at the base end 29. This open end is housed within a larger diameter reservoir tank 39. The inner cylinder 33a forms a first chamber 33b between the open end and the piston head 32, and the stem chamber 38 between the piston head 32 and the stem end 30. A port 40 is formed between the inner cylinder 33a and the reservoir tank 39 to permit unrestricted fluid movement therebetween. The reservoir tank or housing 39 is positioned and sealed around a substantial portion of the inner cylinder 33a. A reservoir chamber 41 is thus formed between the outer walls of the inner cylinder 33a and the inner walls of the reservoir tank 39. The reservoir chamber 41, port 40 and first chamber 33b connected in series form the base chamber 35.

The chambers 35 and 38 are filled with a fluid such as a hydraulic oil. The fluid is admitted through a port 42 in the reservoir tank 39, which port is then sealed with plug 43. While it is conceivable that the fluid flow between the stem and base chambers 39, 35 could be achieved by a siphon action, preferably a compressible body 44, such as an air cushion or a spring, is contained in the reservoir tank, the function of which will be later described.

Cylinder rod weldments 46 and 47 are rigidly attached to the ends of the cylinder assembly 18 to facilitate attachment in the dockleveller. As shown in FIG. 10, rod weldment 46 rigid with the piston element is linked to the lever arms 10 with pivot pin 22. Rod weldment 47, rigid with the cylinder element 33, is linked to the link arms 9 with pivot pin 28. In this manner of attachment, the cylinder assembly 18 expands and retracts respectively in response to the dockboard being raised or lowered. It will be realized that the cylinder assembly 18 could be inverted without affecting the intended function of the hold-down.

THE VALVE MEANS

With reference to FIGS. 11 and 12, valve means 19 are shown mounted below the hydraulic cylinder assembly 18. The valve means includes a valve body 48 having a cylindrical bore 49 therethrough. The bore 49 is sealed at one end with plug 50, and at the other end with a plunger element 51.

A narrow seating portion 52 is provided in the bore 49, forming first and second valve chambers 53 and 54 on either side thereof. Conduit 45 leading from the reservoir chamber communicates with the second valve chamber 54 through a port 55. The first valve chamber 53 communicates with the stem chamber through port 56 which is threaded into the cylinder element 33.

In order to control the fluid movement through the valve body 48 a valve member, such as, a check ball 57, is contained in the first valve chamber 53, which check ball 57 is seatable on the narrow seating portion 52 to restrict fluid movement between the two chambers 38 and 41. The check ball 57 is sized to provide a tolerance between the check ball 57 and the inner walls of the first valve chamber 53. In this manner, fluids can bypass the check ball 57 when it is in an unseated position.

Mechanical opening means are provided in the valve means 19 to unseat the check ball 57, thereby opening the valve means to permit the cylinder assembly to be expanded. The mechanical opening means include the plunger element 51 translatable in the second valve chamber 54. The plunger element 51 has a rod 58 having an inner end 59 in contact with the check ball 57. The outer end 60 of the plunger element 51 is in contact with a control lever 61. The control lever 61 has an upper end 62 pivotally connected to the valve body 48. The lower end 63 of the control lever is attached to a cable 64 (not shown). The opposite end of the cable 64 is attached to a pull ring 65 (not shown) which protrudes through the dockboard 4.

The valve means can thus be opened mechanically by pulling on the pull ring 65. This provides a sufficiently large manual force to the control lever 61 to push the plunger element 51 along the second valve chamber 54 and thereby unseat the check ball 57.

The check ball 57 is preferably spring-loaded to facilitate the seating and unseating of the check ball 57. A compression spring 66 is contained in the first valve chamber 53 compressed between the plug 50 and the check ball 57. This spring 66 exerts a seating force on the check ball 57 and keeps the check ball 57 in alignment with the seating portion 52. This seating force must be overcome in order to unseat the check ball 57. This is accomplished by either pulling on pull ring 65 as described above, or by generating a fluid pressure in the base chamber sufficiently greater than the fluid pressure in the stem chamber.

A plunger return spring 67 is compressed between the plunger element 51 and the narrow seating portion 52. When the plunger element 51 is pushed along the second valve chamber 54, the spring 67 is compressed. Thus when the pull ring 65 is released, the spring 67 is operable to return the plunger element 51 to the position shown in FIG. 12.

The valve means 19 as described above are operative to remain closed if the fluid pressure in the stem chamber is sufficiently greater than the fluid pressure in the reservoir chamber, provided the mechanical opening means is inoperative.

Pressure Release Means

For safety purposes, a pressure release means 70 can be provided intermediate the stem and base chambers 38 and 35 as shown in FIG. 12. The pressure release means constitute a normally closed safety valve functional to open only if the fluid pressure in the stem chamber 38 is greater than a normal operating pressure. By normal operating pressure is meant the fluid pressure generated in the stem chamber as the upward force is imparted on the dockboard by the dock-raising means 8.

Pressures greater than the normal operating pressure may arise from a number of sources. The dockboard in the declined or elevated loading positions essentially rests on the vehicle platform. Any upward vertical movement of the vehicle platform, as is permitted by the vehicle springs, is transmitted to the dockboard and thus into the hold-down. A sufficiently great upward force on the dockboard, in the absence of the pressure release means 70, could cause considerable damage to the hold-down. Additionally, if the pull ring 65 is released before the dockboard is raised to the fully raised position, the valve means immediately close. The momentum of the still moving dockboard, after the hold-down is locked, could be sufficient to damage the unit.

The safety valve includes a port 71 through the piston head 32, connecting the stem and base chambers 38 and 35. A check ball 72 is seatable on seat 73, restricting fluid movement between the two chambers when seated. A compressible spring 74 is located in the port 71 and is operative to maintain the check ball 72 in a seated position unless the fluid pressure in the stem chamber rises above a normal operating pressure. Once this critical pressure is reached, the compressible spring is compressed, permitting the fluid to move from the stem chamber 38 to the base chamber 35, thereby expanding the cylinder assembly.

OPERATION

FIGS. 1–5 and 6–9 are illustrative of the operation of the hold-down device 1 in combination with the dock-leveller 2.

In the horizontal cross-traffic position shown in FIGS. 1 and 6, rotation of the dockboard 4 is locked against the continuous upward force imparted by the mechanical dock-raising means 8. More particularly the upward force exerted by the booster spring 15 is attempting to open cylinder assembly 18 and causes the fluid pressure in the stem chamber 38 to be greater than the fluid pressure in the base chamber 35. This fluid pressure in the stem chamber 38 keeps the valve means closed, thereby preventing the expansion of the cylinder assembly.

To raise the dockboard 4, the operator pulls on pull ring 65 which in turn pivots the control lever 61 pushing the plunger element 51 into the valve body 48 to unseat the check ball 57. As the dock-raising means 8 expands the cylinder assembly 18 the fluid moves from the stem chamber to the reservoir chamber as illustrated in FIG. 2. In this manner, the mechanical opening means is operative to open the valve means 19 permitting the cylinder assembly to be expanded as the dock-raising means 8 raises the dockboard 4.

Once the dockboard is raised to the fully raised position shown in FIGS. 3 and 7, the operator releases the pull ring 65. The plunger return spring 67 and the compression spring 66 then reseat the check ball 57.

To lower the dockboard 4 to a loading position, (FIGS. 5, 8 and 9) level with the vehicle platform (not shown), the operator walks onto the dockboard 4. This man weight causes the compressible body 44 in the reservoir chamber 41 to be compressed, forming a fluid pressure in the reservoir chamber 41 greater than that pressure in the stem chamber 38 by an amount sufficient to unseat the check ball. In response to the downward force on the dockboard, fluid movement is directed from the reservoir chamber 41 to the stem chamber 38 permitting the cylinder assembly to contract, as shown schematicaly in FIG. 4. In addition to opening the check valve, the pressure generated in the reservoir chamber 41 by the compressible body 44 increases the flow rate between the reservoir and stem chambers 39, 41. This in turn enables the cylinder assembly, and thus the dockboard to be rapidly moved between positions and subsequently locked.

Once the lip member 16 of the dockboard contacts the vehicle platform the fluid pressures in the reservoir and stem chambers 41 and 38 are approximately equal and fluid movement therebetween is stopped. The operator then walks off the dockboard. The dock-raising means 8 immediately pressurize the fluids in the stem chamber 38 which pressure is sufficient to close the valve means 19 and thereby lock the dockboard 4 at this level.

After the vehicle has driven away from the loading bay 3, the operator again walks onto the dockboard. This man weight, as described above, opens the valve means 19, permitting the cylinder to contract as the dockboard is lowered to the cross-traffic position. The operator then walks off the dockboard; the dock-raising means 8 pressurize the stem chamber fluids to close the valve means and lock the dockboard in this position.

While the present invention has been disclosed in connection with the preferred embodiment thereof, it should be understood that there may be other embodiments which fall within the spirit and scope of the invention as defined by the following claims.

The embodiments of the invention in which an exclusive property or privilege is claimed are defined as follows:

1. A hold-down device for use in a dockleveller wherein a dockboard is pivotally mounted at its inner end to a base frame for rotation about said pivot between cross-traffic, fully raised and declined positions and wherein mechanical dockboard raising means are provided to rotate the dockboard upwardly from the declined and cross-traffic positions to the fully raised position, said hold-down device comprising:

a hydraulic cylinder assembly having a stem end and a base end and comprising a piston element, having a piston head, and a cylinder element within which the piston element reciprocates, said assembly being mountable so that one of the elements may be interconnected with the dockboard and the other element may be interconnected with the base frame, whereby the cylinder assembly may expand and contract respectively in response to the dockboard being raised and lowered;

said cylinder assembly having a fluid-filled stem chamber and a fluid-filled base chamber, the volume of fluid in the base chamber when the cylinder assembly is fully expanded being greater than the volume of fluid in the stem chamber when the cylinder assembly is fully contracted, said piston head being adapted to prevent fluid movement between the chambers;

said fluid in the base chamber comprising a body of compressible fluid;

first and second conduit means extending from the stem and base chambers;

check valve means connecting said conduit means and controlling fluid movement through the conduit means between the chambers;

said check valve means comprising a valve body forming a first valve chamber, a first port connecting the valve chamber with the conduit means communicating with the stem chamber, a second port connecting the valve chamber with the conduit means communicating with the base chamber, and a valve seat at the end of the valve chamber adjacent the second port, and a valve member disposed in the valve chamber, for seating on the valve seat to prevent flow through the valve chamber;

first means for mechanically unseating the valve member to permit the cylinder assembly to be expanded as the dock-raising means raises the dockboard, said first means extending through the valve body wall in sealing engagement therewith and being exposed only to the low pressure in the base chamber;

said check valve means being operative to close if there is a greater fluid pressure in the stem chamber than in the base chamber and the first means is inoperative, thereby preventing expansion of the cylinder assembly;

said valve means being operative to open if there is a greater fluid pressure in the base chamber than in the stem chamber, thereby permitting the cylinder assembly to contract.

2. The device as set forth in claim 1 wherein:

the cylinder element comprises an open-ended inner cylinder, within which the piston element reciprocates, and an outer reservoir tank, the open end of the inner cylinder communicating with the tank which is sealed to the cylinder, the second conduit means communicating with said tank.

* * * * *